United States Patent
Niu et al.

(10) Patent No.: US 12,092,481 B2
(45) Date of Patent: Sep. 17, 2024

(54) DISTANCE MEASURING METHOD BASED ON MOVING COORDINATE POSITIONING AND PORTABLE TERMINAL DEVICE

(71) Applicant: Guangdong Coros Sports Technology Co., Ltd., Guangdong (CN)

(72) Inventors: Haotian Niu, Guangdong (CN); Xuan Rao, Guangdong (CN); Yu Tang, Guangdong (CN)

(73) Assignee: Guangdong Coros Sports Technology Co., Ltd., Dongguan (CN)

( * ) Notice: Subject to any disclaimer, the term of this patent is extended or adjusted under 35 U.S.C. 154(b) by 1017 days.

(21) Appl. No.: 16/801,533

(22) Filed: Feb. 26, 2020

(65) Prior Publication Data

US 2021/0140794 A1    May 13, 2021

(30) Foreign Application Priority Data

Nov. 8, 2019  (CN) .......................... 201911093208.1
Nov. 25, 2019 (CN) .......................... 201911169932.8

(51) Int. Cl.
| | |
|---|---|
| G01C 22/00 | (2006.01) |
| A63B 24/00 | (2006.01) |
| G01C 21/20 | (2006.01) |
| G01S 19/19 | (2010.01) |
| G06F 1/16 | (2006.01) |

(52) U.S. Cl.
CPC .......... G01C 22/00 (2013.01); A63B 24/0062 (2013.01); G01C 21/20 (2013.01); G01S 19/19 (2013.01); G06F 1/163 (2013.01)

(58) Field of Classification Search
CPC .. A63B 24/0062; G01C 21/20; G01C 25/005; G01S 19/393; G01S 19/19; G01S 19/40
See application file for complete search history.

(56) References Cited

U.S. PATENT DOCUMENTS

| | | | | |
|---|---|---|---|---|
| 6,009,138 A  * | 12/1999 | Slusky | ............... | A63B 24/0021 377/5 |
| 8,787,917 B1* | 7/2014 | Barrett | ............... | G01C 21/3461 455/445 |
| 2001/0002455 A1* | 5/2001 | Uekawa | ................. | G01C 21/26 701/520 |
| 2008/0082254 A1* | 4/2008 | Huhtala | ................. | G01C 21/00 701/533 |
| 2010/0217522 A1* | 8/2010 | Ando | ..................... | G01S 19/49 701/532 |

(Continued)

FOREIGN PATENT DOCUMENTS

| | | |
|---|---|---|
| CN | 106959113 A | 7/2017 |
| JP | 2014115196 A | 6/2014 |

*Primary Examiner* — Michael J Dalbo
(74) *Attorney, Agent, or Firm* — ANOVA LAW GROUP, PLLC

(57) ABSTRACT

A distance measurement method based on moving coordinate positioning includes generating a calibration track adaptive to a predetermined route in a detection terminal; obtaining a real-time movement track of the detection terminal according to a moving coordinate positioning; and correcting a distance recorded by the detection terminal in real time according to a comparison result between the movement track and the calibration track. In such a way, the distance error recorded in the detection terminal can be corrected, thereby improving the accuracy.

23 Claims, 7 Drawing Sheets

(56) References Cited

U.S. PATENT DOCUMENTS

| | | | |
|---|---|---|---|
| 2010/0332126 A1* | 12/2010 | Huang | G01C 21/30 |
| | | | 701/532 |
| 2011/0175756 A1* | 7/2011 | Whiton | G01C 21/3626 |
| | | | 340/995.19 |
| 2013/0138394 A1* | 5/2013 | Shiga | G01C 22/006 |
| | | | 702/160 |
| 2013/0238235 A1* | 9/2013 | Kitchel | G01S 19/19 |
| | | | 701/445 |
| 2014/0046588 A1* | 2/2014 | Maezawa | G01C 22/00 |
| | | | 701/487 |
| 2015/0345977 A1* | 12/2015 | Saito | B60L 53/00 |
| | | | 701/521 |
| 2018/0003516 A1* | 1/2018 | Khasis | G08G 1/207 |
| 2018/0188065 A1 | 7/2018 | Brooks et al. | |
| 2018/0349728 A1* | 12/2018 | Wang | G01S 5/0294 |
| 2020/0018618 A1* | 1/2020 | Ozog | G01S 7/52004 |
| 2020/0061472 A1* | 2/2020 | Jacoby | A63F 13/216 |
| 2021/0041249 A1* | 2/2021 | Roca Rosero | G01C 21/30 |

* cited by examiner

DISTANCE MEASURING METHOD BASED ON MOVING COORDINATE POSITIONING AND PORTABLE TERMINAL DEVICE

RELATED APPLICATIONS

This application claims the benefit of priority to Chinese invention applications No. 201911169932.8 filed on Nov. 25, 2019, and No. 201911093208.1 filed on Nov. 8, 2019, which is hereby incorporated by reference in its entirety.

FIELD OF THE INVENTION

The present invention relates to a field of movement distance measurement technology based on moving positioning, in particular to a distance measurement method based on moving coordinate positioning and a portable terminal device.

BACKGROUND OF THE INVENTION

Distance measurement devices such as moving positioning sports watches or other portable devices (such as mobile phones) based on moving positioning coordinates can record movement tracks and display running data in real time, including time, distance, speed, etc. Moving positioning distance measurement method aims at comprehensively calculating position change caused by continuous movements of the moving positioning device within a certain period of time. Under different moving positioning signal conditions, the accuracy of the coordinate recorded by the distance measurement device can vary from 1 meter to 20 meters, and the distance statistical error range is from 5% to 10%, even if the algorithm is used for compensation and correction, there are still large errors. For example, when running in a standard circular track, the user usually repeats the same track round and round, and a fixed lap distance (for example, 400 meters) is taken as a reference, which makes the user more easy to know the distance error calculated by the moving positioning watch. For example, when racing on a standard 400-meter track and field, the user keeps running forward on the first lane (400 meters) and repeating the target laps. In a conventional moving positioning distance measurement method, an error between a recorded distance and the standard distance of the track occurs more or less when user completes each lap to return to the starting point again, and the cumulative error may become greater when more laps are recorded, such a cumulative error may reach tens of meters in a long-distance running training with dozens of laps. For another example, in city marathon race and cross-country marathon race, due to the long track, it is difficult for athletes to know exactly how far they are moving on the track based on ordinary positioning watches.

SUMMARY OF THE INVENTION

One objective of the present invention is to provide a distance measurement method based on moving coordinate positioning, which corrects the track changes within the error range of the moving positioning signal and improves the accuracy of moving distance measurement along the predetermined route.

Another objective of the present invention is to provide a portal terminal device, which corrects the track changes within the error range of the moving positioning signal and improves the accuracy of moving distance measurement along the predetermined route.

To achieve the above objectives, the present invention provides a distance measurement method based on moving coordinate positioning, which includes:
generating a calibration track adaptive to a predetermined route in a detection terminal;
obtaining a real-time movement track of the detection terminal according to a moving coordinate positioning; and
correcting a distance recorded by the detection terminal in real time according to a comparison result between the movement track and the calibration track.

In comparison with the prior art, when using the distance measurement method based on the moving coordinate positioning of the present invention to perform movement distance monitoring, a calibration track adapted to a predetermined route is generated in the detection terminal in advance. After the calibration track is generated, which length and position are fixed, a real-time movement track of a user carrying the detection terminal can be obtained by detecting the moving coordinate of the user in real time based on moving positioning technology, and then a distance recorded by the detection terminal can be corrected in real time according to a comparison result between the movement track and the calibration track. In such a way, the distance error recorded in the detection terminal can be corrected, thereby improving the accuracy.

Preferably, at least one path parameter model is preset in the detection terminal and is adapted for generating the calibration track with a standard geometry according to a length of the predetermined route that is input.

Preferably, before generating the calibration track, the method further includes a step of generating a preset calibration track: generating a preset calibration track corresponding to the predetermined route according to the length of the predetermined route; and taking the preset calibration track as the calibration track if the movement track of the detection terminal is within a range of the preset calibration track.

Preferably, said correcting a distance recorded by the detection terminal specifically includes: after the calibration track is generated, mapping the real-time coordinate of the detection terminal to the calibration track that is adjacent one another to form a correction coordinate if a subsequent movement track of the detection terminal is within a range of the calibration track; and calculating a real-time movement distance of the detection terminal according to the correction coordinate.

Preferably, after the calibration track is generated, if the movement track of the detection terminal deviates from the range of the calibration track during the subsequent movement, the real-time movement distance at a current stage is directly calculated according to the real-time coordinate of the detection terminal.

Preferably, the correction coordinate is located at a vertical connection point between a real-time coordinate and a forward direction of movement.

Preferably, when the calibration track output by the path parameter model is annular, the number of movement laps is calculated by the detection terminal according to an initial coordinate.

Preferably, a range of the calibration track is to radiate circles with a circle center of any point on the calibration track and a radius of 10-20 meters.

Preferably, the path parameter model includes any one or more of international standard race track, rectangular track, circular track, and oval track.

Preferably, the detection terminal implements coordinate positioning based on any or more of Global Positioning System (GPS), BeiDou Navigation Satellite System (BDS), GLONASS Navigation Satellite System and GALILEO Navigation Satellite System.

The present invention further provides a portal terminal device, which includes:
a portal detection terminal, comprising a calibration track generation module and a correction module;
the calibration track generation module, adapted for generating a calibration track adaptive to a predetermined route in the detection terminal;
the correction module, adapted for obtaining a real-time movement track of the detection terminal, and correcting a distance recorded by the detection terminal in real time according to a comparison result between the movement track and the calibration track.

Preferably, the calibration track generation module comprises at least one path parameter model adapted for generating the calibration track with a standard geometry according to data of the predetermined route that is input.

Preferably, the path parameter model is adapted for generating a preset calibration track corresponding to the predetermined route according to the data of the predetermined route, and taking the preset calibration track as the calibration track if the movement track of the detection terminal is within a range of the preset calibration track.

Preferably, the calibration track generation module is adapted for generating the calibration track according to a route file imported to the detection terminal.

Preferably, the route file is imported from a navigation map application built in the detection terminal or other devices.

Preferably, the correction module is adapted for performing a correction process including: after the calibration track is generated, mapping the real-time coordinate of the detection terminal to the calibration track that is adjacent one another to form a correction coordinate if a subsequent movement track of the detection terminal is within a range of the calibration track; and calculating a real-time movement distance of the detection terminal according to the correction coordinate.

Preferably, the correction module is further adapted for performing a correction process including if the movement track of the detection terminal deviates from the range of the calibration track, the real-time movement distance at a current stage is directly calculated according to the real-time coordinate of the detection terminal.

Preferably, the detection terminal is provided with a lap recorder which is adapted for calculating the number of movement laps accordingly to an initial coordinate of the detection terminal when the calibration track output by the path parameter model is annular.

Preferably, a range of the calibration track is to radiate circles with a circle center of any point on the calibration track and a radius of 10-20 meters Preferably, the path parameter model includes any one or more of international standard race track, rectangular track, circular track, and oval track.

Preferably, the detection terminal implements coordinate positioning based on any or more of Global Positioning System (GPS), BeiDou Navigation Satellite System (BDS), GLONASS Navigation Satellite System and GALILEO Navigation Satellite System.

Additionally, the present invention provides a portal terminal device including:
one or more processors;
a memory; and
one or more programs, stored in the memory and configured to be executed by said one or more processors, and said one or more programs comprising instructions for executing the distance measurement method based on the moving coordinate positioning mentioned above.

Further, the present invention provides a computer-readable storage medium including a computer program for testing, and the computer program being executed by a processor to implement the distance measurement method based on the moving coordinate positioning mentioned above.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

A distinct and full description of the technical solution of the present invention will follow by combining with the accompanying drawings.

Figure 1:
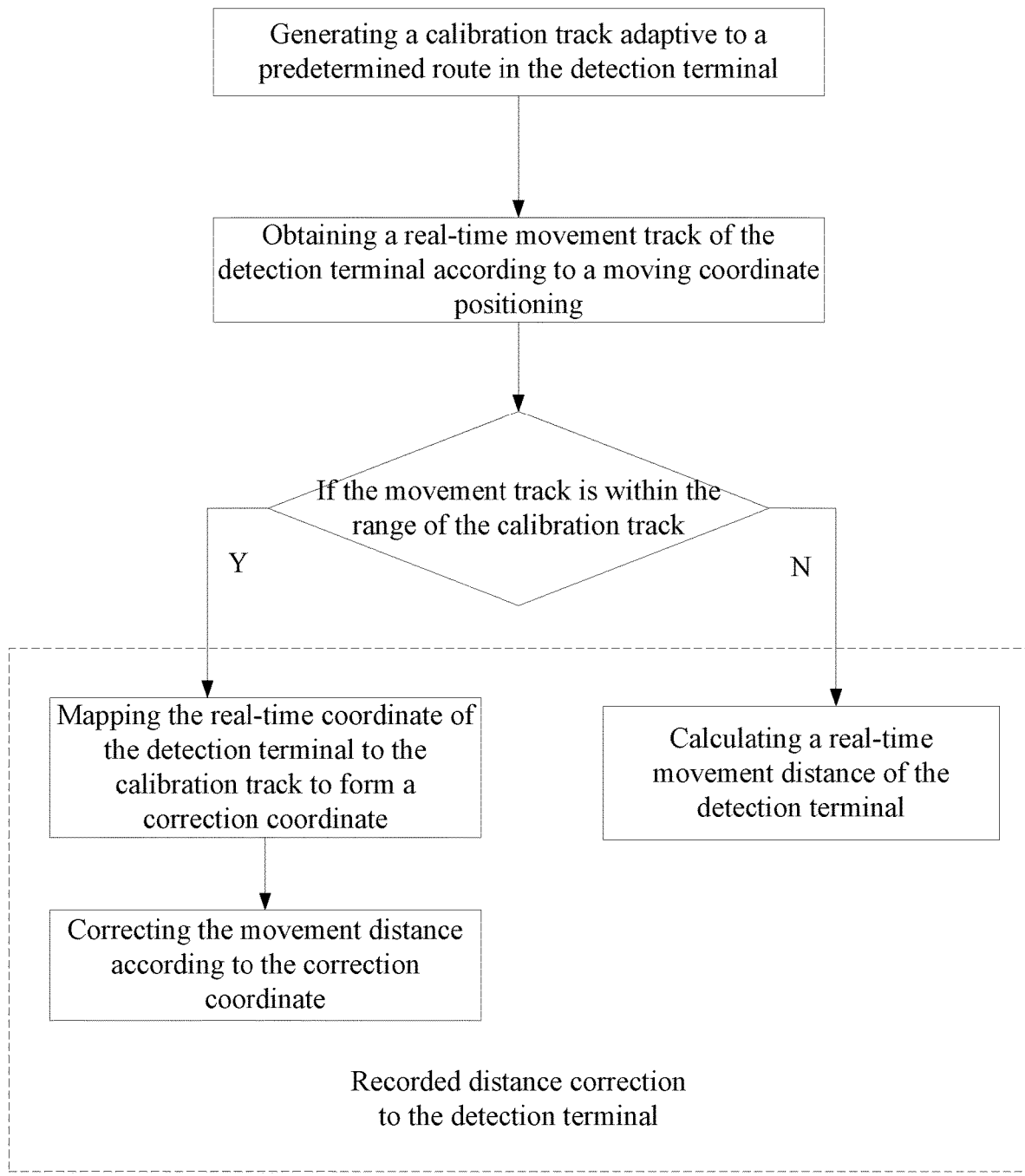
FIG. 1 is a flowchart of a distance measurement method based on moving coordinate positioning according to an embodiment of the present invention.
Figure 4:
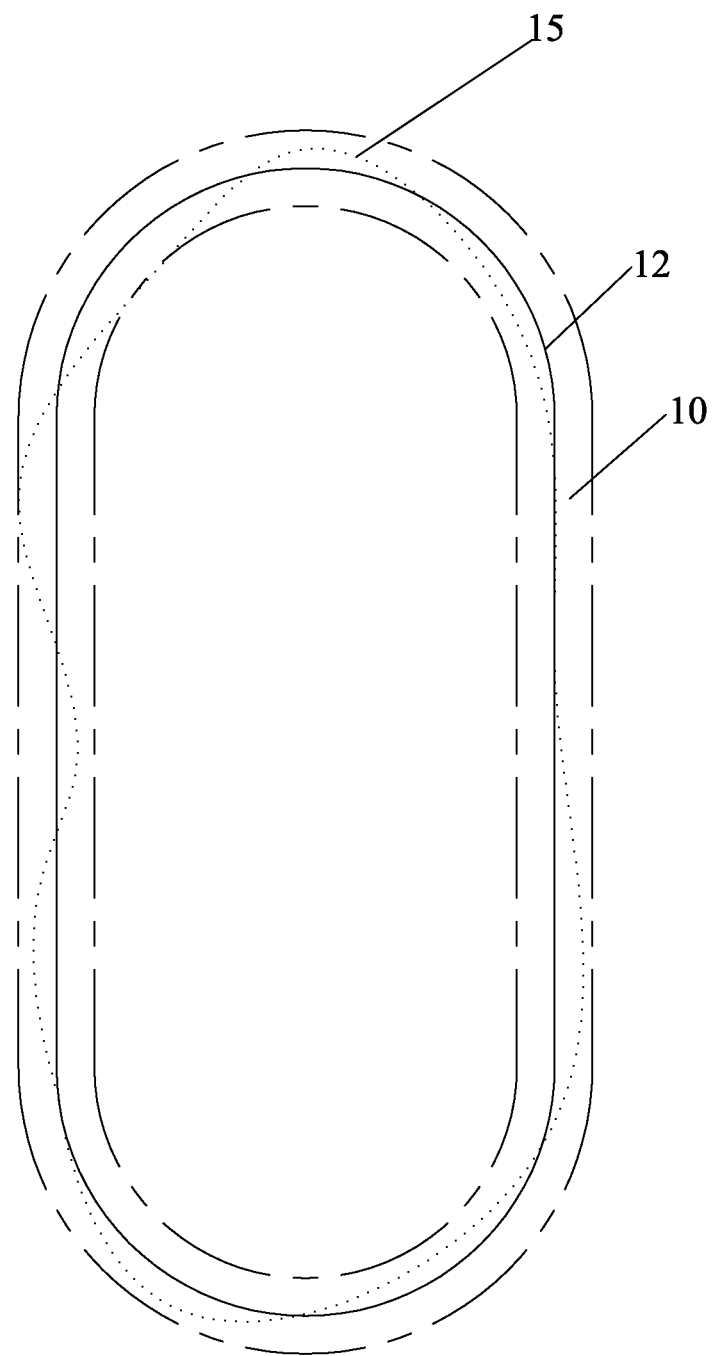
FIG. 4 is a schematic diagram displaying a path parameter model in the detection terminal which is started, according to an embodiment of the present invention, wherein a preset calibration track has be taken effect as a calibration track.

The present invention discloses a distance measurement method based on moving coordinate positioning, and a portable detection terminal is included. Referring to FIGS. 1 and 4, the method includes:
generating a calibration track 12 adaptive to a predetermined route 10 in the detection terminal;
obtaining a real-time movement track 15 of the detection terminal according to a moving coordinate positioning; and
correcting a distance recorded by the detection terminal in real time according to a comparison result between the movement track 15 and the calibration track 12.

When using the distance measurement method based on the moving coordinate positioning of the present invention to perform moving distance monitoring, a calibration track 12 adapted to a predetermined route 10 is generated in the detection terminal in advance. After the calibration track 12 is generated, the length and route of the calibration track 12 can be determined. Then during the subsequent movement of the user carrying the detection terminal, by detecting the movement coordinates of the user in real time by means of moving positioning technology, a real-time movement track 15 is obtained, and then the moving distance of the user recorded in the detection terminal is corrected in real time based on a comparison result between the movement track 15 and the calibration track 12. By this token, the error of the movement recorded by the detection terminal can be corrected through the above-mentioned distance measuring method thereby improving the accuracy. Specifically, the detection terminal may be a moving positioning watch or a mobile phone with a moving positioning ranging function, or other moving positioning ranging devices. A moving coordinate positioning module is provided in the detection terminal, for detecting real-time moving positioning coordinate data of the detection terminal. The moving coordinate positioning module may one or more of a Global Positioning System (GPS), BeiDou Navigation Satellite System (BDS), GLONASS Navigation Satellite System and GALILEO Navigation Satellite System.

The generation manners of the above-mentioned calibration track 12 in the present invention include generating by a path parameter model, and generating based on an imported route file that can be recognized by the detection terminal, which will be described in detail below.

The specific method of generating the calibration track 12 according to the path parameter model is as follows.

Figure 2:
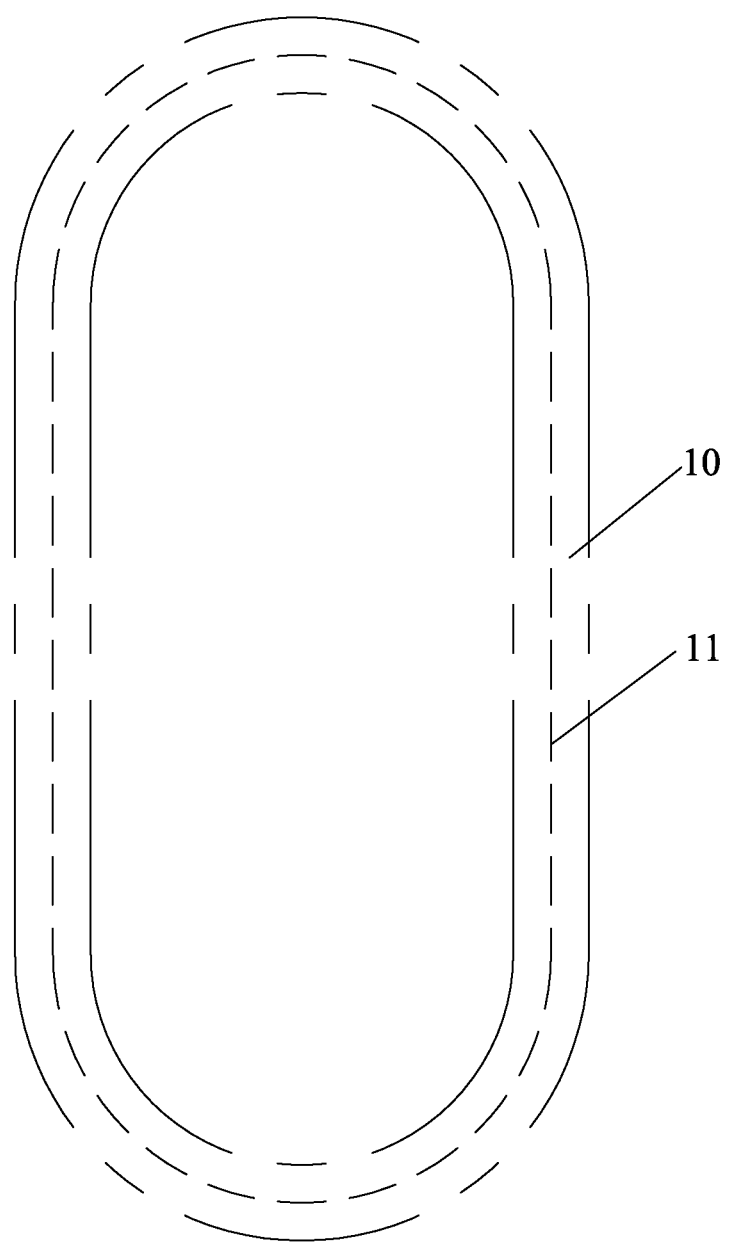
FIG. 2 is a schematic diagram showing a preset calibration track generated after a path parameter model is started according to an embodiment of the present invention.
Figure 3:
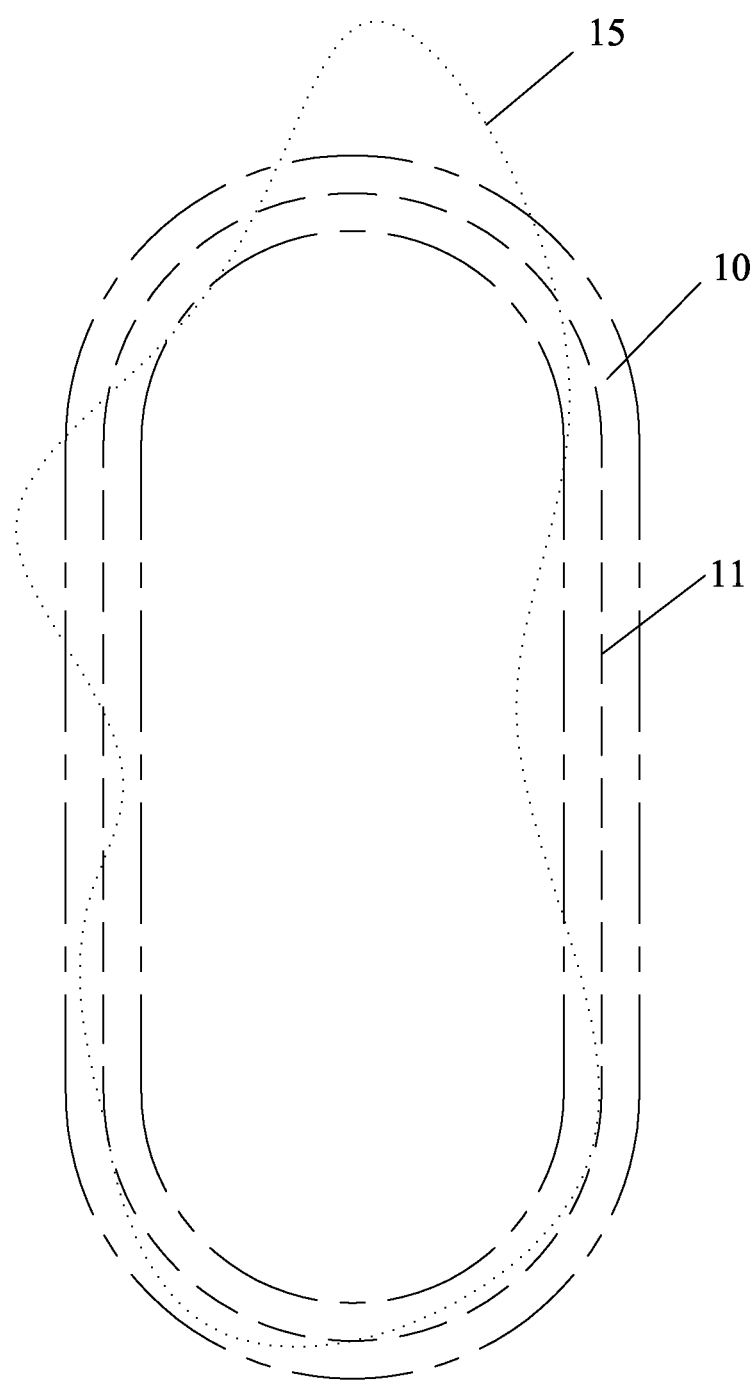
FIG. 3 is a schematic diagram showing a path parameter model which is started, according to an embodiment of the present invention, wherein a preset calibration track is not taken effect yet

At least one path parameter model is preset in the detection terminal, and the path parameter model can generate a calibration track 12 with a standard geometry according to the length of the input predetermined route 10. When generating the calibration track 12 through the path parameter model, it is preferable that the calibration track 12 generated is a ring connected end to end. The calibration track 12 with so-called a standard geometry is a standard track that can be generated by a mathematical model, such as an international standard race track, a circular track—a rectangular track—and the like. The length of the entered predetermined route 10 includes, but is not limited to, the following situations: when the predetermined route 10 is a rectangular track, the length and width is input in the detection terminal; when the predetermined route 10 is a circular route, radius is input in the detection terminal; when the predetermined route 10 is an international standard race route, a single lap distance is input in the detection terminal, and the detection terminal automatically outputs a calibration track 12 adapted to the predetermined route 10 according to the input parameter or data. To ensure that the calibration track 12 generated in the detection terminal matches with the predetermined route 10 used for actual selection, preferably, a preset calibration track 11 is generated before the calibration track 12 is generated, as shown in FIG. 2 and FIG. 4. That is, the path parameter model first generates a preset calibration track 11 corresponding to the predetermined route 10 according to the length of the input predetermined route 10. During the subsequent movement of the user carrying the detection terminal, it is required to determine whether the movement track 15 detected by the detection terminal at the certain length is located within the range of the preset calibration track 11, if yes (as shown in FIG. 4), the preset calibration track 11 becomes effective and becomes the calibration track 12, whereby the movement distance of the user is corrected; if no (as shown in FIG. 3), repeating the above determination, or reminding the user to change parameters or change the selected route. Taking the selected route as a 400-meter international standard circular runway as an example, when a length parameter of 400 meters is input, a preset calibration track 11 corresponding to the 400-meter international standard circular runway is generated on the detection terminal. At this time, the preset calibration track 11 can be present in a flashing state or a low-light display state, and then the user starts running with the detection terminal. And then determining whether the user's track 15 of the first lap is within the range of the preset calibration track 11 according to the movement positioning coordinates. If yes, it means that the user's current motion path is a pre-selected predetermined route 10, and the preset calibration track 11 becomes effective and becomes the calibration track 12, at this time, the flashing state stops or the low light is changed to the high light; if not, continuing to determine whether the motion of the second lap is a pre-selected predetermined route 10, or reminding the user to change parameters or change the selected route.

The specific method for generating the calibration track 12 based on the imported route file that can be recognized by the detection terminal includes the two methods as follows.

1. Build in a navigation map application in the detection terminal. When in use, firstly open the navigation map application, select a predetermined route 10 in the navigation map application, and then save a generated route file which is imported into the a hardware device of the detection terminal for generating a calibration track 12, in such a way, a calibration track 12 is generated.

2. Generate a track of the predetermined route 10 from a navigation map application of other terminal devices, and then save a generated route file which is imported into the hardware device a hardware device of the detection terminal for generating a calibration track 12. In this embodiment, a route file generated on the other terminal devices can be imported through a wired or wireless connection, or an APP connected to the detection terminal.

In the above embodiment, when an action of generating a route file is selected, the route can be manually drawn directly in the navigation map application, or the starting point and the end point can be manually input, and multiple routes are created accordingly to be optionally selected. After a route is drawn manually, a distance of the route that is obtained though the approximate length of the route can be input manually, and then the navigation map application will correct the details of the already drawn route based on the manually entered distance data so that the route track becomes more rounded and standard.

Figure 5:
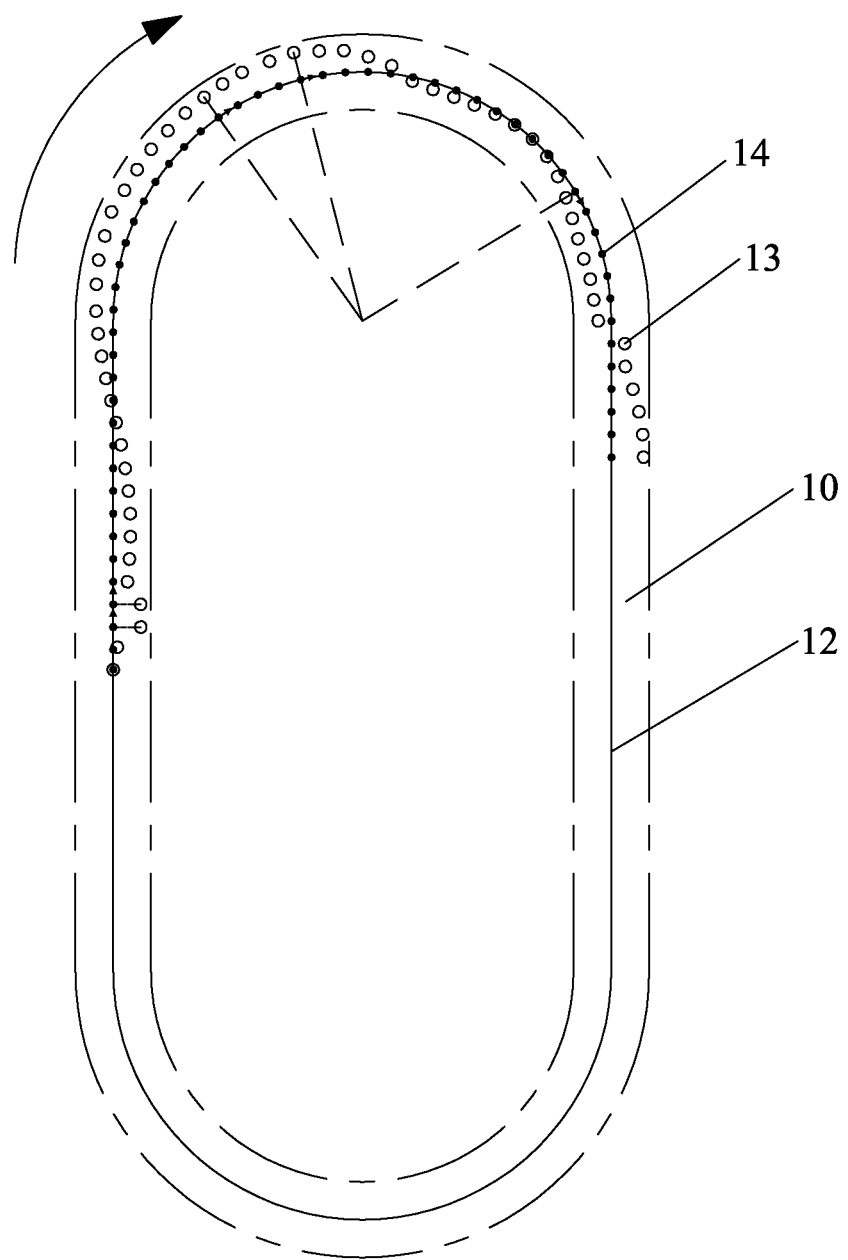
FIG. 5 is a schematic diagram showing that the real-time coordinates are mapped to a calibration track according to an embodiment of the present invention.

After the calibration track 12 is generated, during the subsequent movement of the user carrying with the detection terminal along the predetermined route 10, the detection terminal can correct the recorded movement distance according to the calibration track 12. Specifically, as shown in FIG. 5, after the calibration track 12 is generated, if the subsequent movement track 15 of the detection terminal is within the range of the calibration track 12, the range of the calibration track 12 is to radiate circles with a circle center of any point on the calibration track and a radius of 10-20 meters for example, and then the real-time coordinate 13 of the detection terminal is mapped to the adjacent calibration track 12 to form a correction coordinate 14, and then a real-time movement distance of the detection terminal is calculated according to the correction coordinates 14. In FIG. 5, the predetermined route 10 selected by the user is a 400-meter runway of an international standard competition, wherein the open circles represent the real-time coordinates 13 forming the track 15 and the solid circles represent the correction coordinates 14 corresponding to each real-time coordinate 13 respectively. The correction coordinates 14 are located on the calibration track 12, and the calibration track 12 is a standard path corresponding to the predetermined route 10, thus no deviation in distance occurs. As long as the user does not deviate from the range of the calibration track 12, the movement distance corresponding to the predetermined route 10 can be calculated, and no error will occur for each lap, that is, when the movement reaches the ¼ position of the predetermined route 10, the detection terminal records the The movement data is 100 meters. When the movement reaches ½ position of the predetermined route 10, the movement data recorded by the detection terminal is 200 meters. When the full lap is run, the movement data recorded by the detection terminal is 400 meters. At this time, the motion data recorded by the detection terminal is 800 meters, thereby correcting the error of the moving positioning signal and the user offset error. The above description is based on a circular 400-meter runway as an example. The same is true for the non-circular scheduled route 10, which is not described in detail here.

As for the specific mapping method of the correction coordinate 14, preferably, as shown in FIG. 5, the correction coordinate 14 is located at a vertical connection point between the real-time coordinate 13 and the moving forward direction, that is, the correction coordinate 14 is mapped in a manner tangential to the moving forward direction, thereby mapping each real-time coordinate 13 in the range of the calibration track 12 to the closest calibration track 12 in the forward direction, so that the correction data is closer to the actual data. Specifically, when the calibration track 12 is a straight line, a vertical auxiliary line is drawn from the real-time coordinate 13 to the calibration track 12, and the foot point is determined to be the correction coordinate; when the calibration track is circular, an auxiliary line is drawn between the real-time coordinate 13 and the center of the circle of the calibration track 12, and the coordinate of the intersection between the auxiliary line and the calibration track 12 is determined to be the correction coordinate 14.

Figure 6:
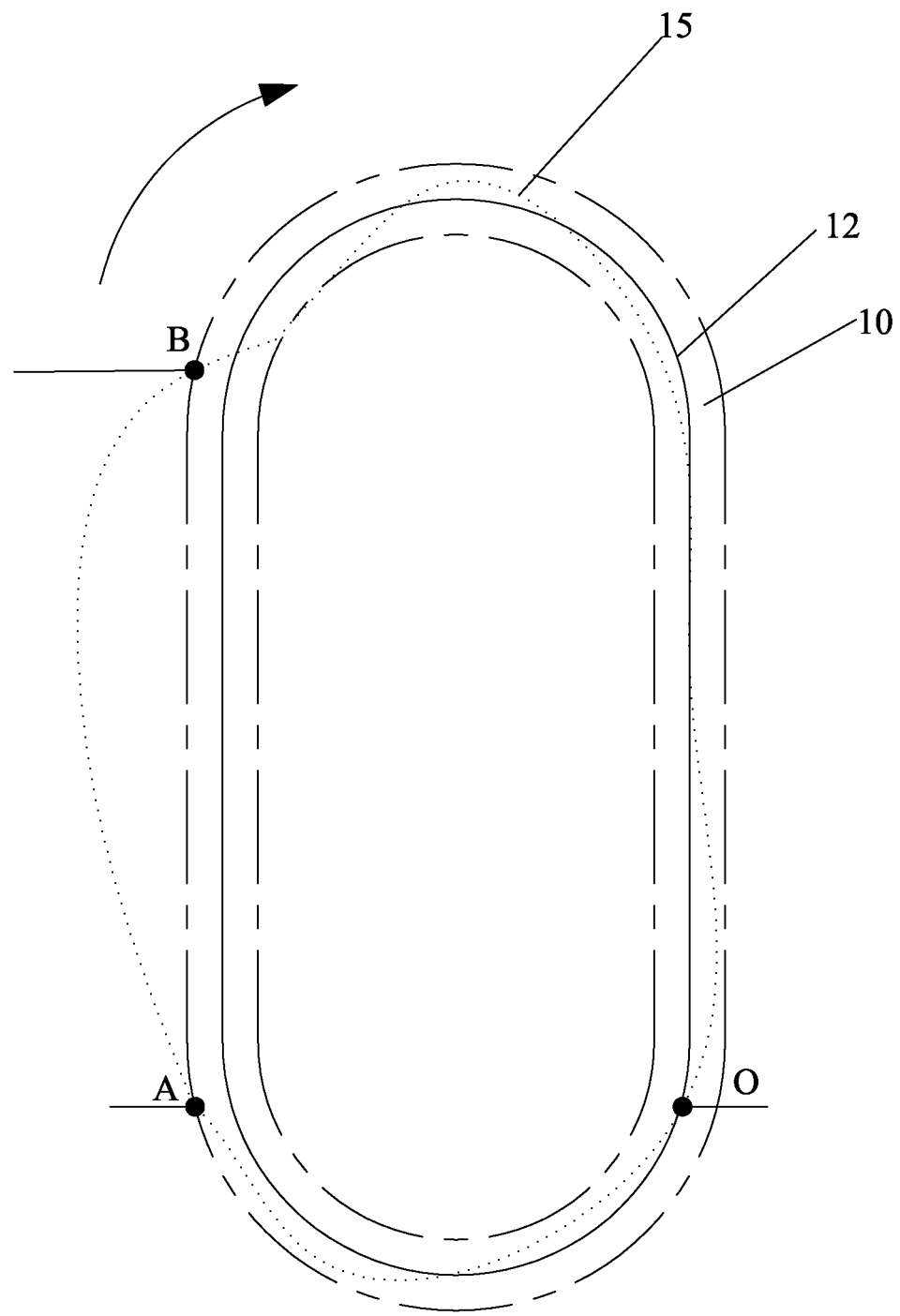
FIG. 6 is a schematic diagram showing that a user deviates from a predetermined route in the implementation of the present invention.

Further, after the calibration track 12 is generated, in the subsequent movement process, if the movement track 15 of the detection terminal carried by the user is out of the range of the calibration track 12, a real-time movement distance is calculated by the detection terminal according to the real-time coordinates 13 that is detected. In this embodiment, the ring-shaped predetermined route 10 is taken as an example below. As shown in FIG. 6, the user clockwise moves starting from the starting point O along the predetermined route 10, when reaching the point A which is deviated from the calibration track 12, a movement distance is calculated by accumulating real-time coordinates 13 of the movement track after the point A. Once the user is detected to move along the calibration track 12 again at the point B, correction coordinates 14 of the track after the point will be accumulated to obtain a movement distance. Assume the length of one lap of the predetermined route 10 is 400 meters, the distance of Section OA is ¼ of the entire predetermined route 10, namely 100 meters, and the distance of Section BO section is ½ of the entire predetermined route 10, namely 200 meters, the calculated length of Section AB is 120 meters, thus the distance data recorded after a lap is 420 meters.

Figure 7:
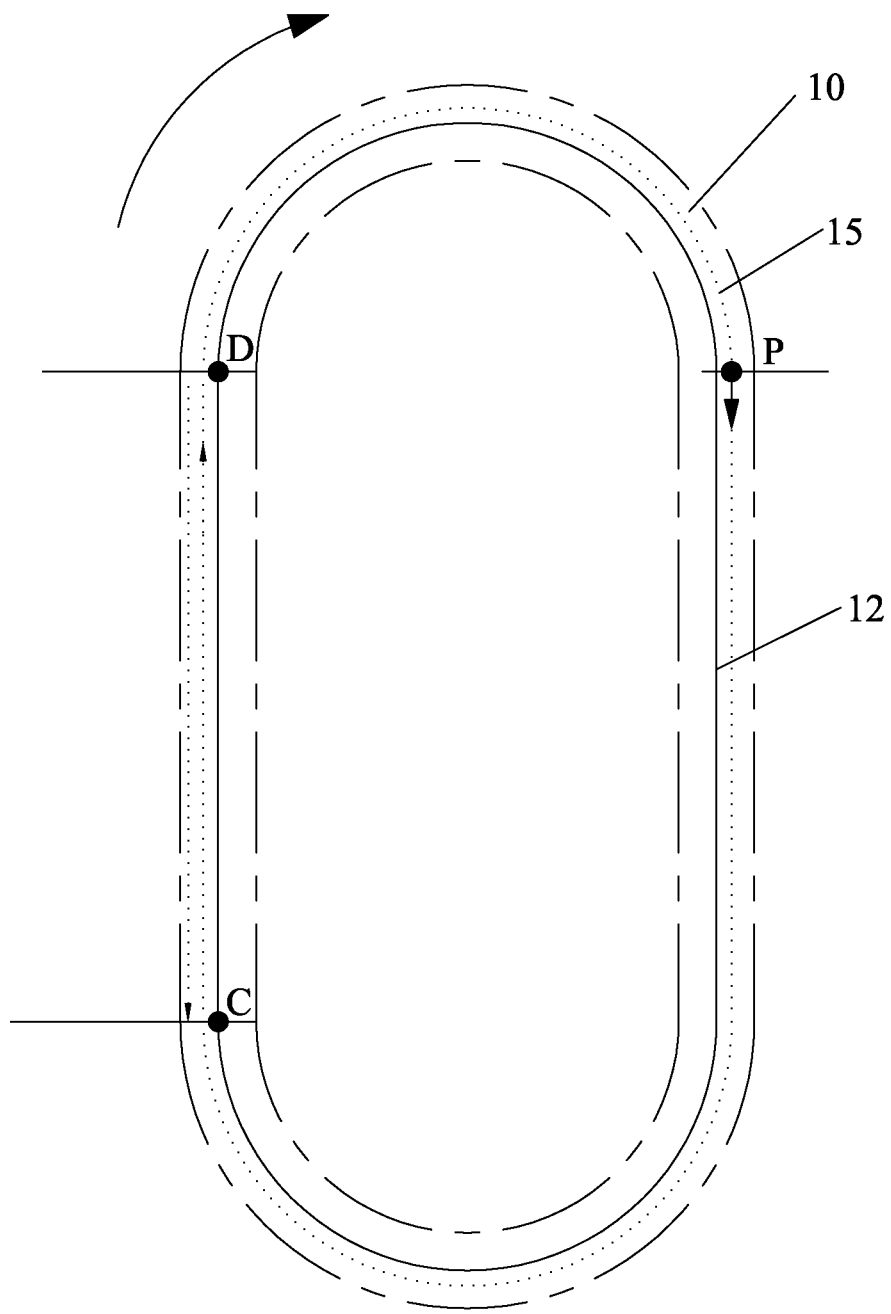
FIG. 7 is a schematic diagram showing that a user turns back in a predetermined route in the implementation of the present invention.

In addition, when the user carrying the detection terminal turns around on the predetermined route 10, his/her movement distance is still accumulated and calculated sequentially as long as he/she fails to deviate from the calibration track 12 at the certain range. As shown in FIG. 7, still taking the 400-meter circular predetermined route 10 as an example. If the user moves clockwise from the starting point P to point D, and then makes U-turn and moves to reach point C, and then makes U-turn again at point C and moves clockwise to reach the starting point P, the distance recorded for such a lap is 600 meters. Preferably, if the calibration track 12 output by the path parameter model is circular, the detection terminal may also calculate the number of movement laps according to an initial coordinate, that is, after the calibration track 12 is confirmed, an initial coordinate will be recorded when the user carrying the detection terminal moves along the predetermined route 10, and the number of the movement laps will be increased with one when the user carrying the detection terminal moves back to the initial coordinate again.

In summary, as shown in FIG. 1 to FIG. 7, the detailed process of monitoring movement distances by using the distance measurement method based on moving coordinate positioning of the present invention follows.

First, a calibration track 12 corresponding to a predetermined route 10 is generated on the detection terminal. Specifically, a route file can be imported from another terminal device or generated on a map application provided in the detection terminal, such that the calibration track 12 is generated accordingly to the route file. Then, when the user carrying the detection terminal moves along the predetermined route 10, the real-time coordinate 13 of the user is detected in real time by the moving coordinate positioning module on the detection terminal during the movement. If the real-time coordinate 13 is located within the preset range of the calibration track 12, the real-time coordinate 13 will be mapped onto the calibration track 12 to form a correction coordinate 14, and finally the user's movement distance is calculated and displayed according to a correction standard. If the real-time coordinate 13 deviates from the range of calibration track 12, the movement distance can be calculated by directly accumulating the real-time coordinates until a current real-time coordinate 13 is located in the range of the calibration track 12 again. In such a way, the distance error caused by the inaccurate moving positioning signal and the movement offset of the user's can be corrected, so that the user can know exactly how far he/she has moved on the entire predetermined route 10, even know his/her current position of the entire predetermined route 10 as long as no deviation and no U-turn occur. When the predetermined route 10 is circular, the number of the movement laps will be increased with one once an overlapping coordinate is detected; and the movement distance will be accumulated once U-turn movement within the preset range of the calibration track 12 is detected.

In order to facilitate the implementation of the above-mentioned distance measurement method, the present invention also discloses a portable terminal device, which includes a portable detection terminal with a calibration track generation module and a correction module provided therein. specifically, the calibration track generation module is adapted for generating a calibration track adaptive to a predetermined route in the detection terminal, the correction module is configured to obtain a real-time movement track of the detection terminal, and correcting a distance recorded by the detection terminal in real time according to a comparison result between the movement track and the calibration track. Preferably, the calibration track generation module includes at least one path parameter model adapted for generating the calibration track with a standard geometry according to data of the predetermined route that is input. Preferably, the path parameter model is adapted for generating a preset calibration track corresponding to the predetermined route according to the data of the predetermined route, and taking the preset calibration track as the calibration track if the movement track of the detection terminal is within a range of the preset calibration track. In addition, the calibration track generation module is adapted for generating the calibration track according to a route file imported to the detection terminal. Preferably, the route file is imported from a navigation map application built in the detection terminal or other devices. Furthermore, the correction module is adapted for performing a correction process including: after the calibration track is generated, mapping the real-time coordinate of the detection terminal to the calibration track that is adjacent one another to form a correction coordinate if a subsequent movement track of the detection terminal is within a range of the calibration track; and calculating a real-time movement distance of the detection terminal according to the correction coordinate. Preferably, if the movement track of the detection terminal deviates from the range of the calibration track, the real-time movement distance at the current stage is directly calculated according to the real-time coordinate of the detection terminal. Preferably, the detection terminal is provided with a lap recorder which is adapted for calculating the number of movement laps accordingly to an initial coordinate of the detection terminal when the calibration track output by the path parameter model is annular. For the working principle and detailed working process of the above portable terminal device, please refer to the above-mentioned distance measurement method, and will not be described again here.

In addition, the present invention also discloses a portable terminal device including one or more processors, a memory, and one or more programs, wherein the one or more programs are stored in the memory and configured to be executed by one or more processors, and the programs include instructions for executing the distance measurement method based on the moving coordinate positioning as described above.

Secondly, the present invention also discloses a computer-readable storage medium, which includes a computer program for testing, and the computer program can be executed by a processor to implement the distance measurement method based on the moving coordinate positioning as described above.

While the invention has been described in connection with what are presently considered to be the most practical and preferred embodiments, it is to be understood that the invention is not to be limited to the disclosed embodiments, but on the contrary, is intended to cover various modifications and equivalent arrangement included within the spirit and scope of the invention.

What is claimed is:

1. A distance measurement method based on moving coordinate positioning, comprising:
   obtaining a movement track of a detection terminal according to a moving coordinate positioning;
   generating a calibration track adaptive to a predetermined route in the detection terminal, including:
      generating a preset calibration track corresponding to the predetermined route according to a length of the predetermined route; and
      in response to determining that the movement track is not within a range of the preset calibration track, reminding a user of the detection terminal to change parameters of the predetermined route or change the predetermined route;
   and
   correcting a distance recorded by the detection terminal in real time according to a comparison result between the movement track and the calibration track;
   wherein correcting the distance recorded by the detection terminal comprises:
      when the movement track of the detection terminal is within a range of the calibration track, mapping real-time coordinates of the detection terminal onto a closest point of the calibration track in a forward direction of movement to form correction coordinates which are located on the calibration track, and calculating a movement distance of the detection terminal according to the correction coordinates; and
      when the real-time coordinates deviate from the range of the calibration track, calculating the movement distance by accumulation according to values of the real-time coordinates until current real-time coordinates are located in the range of the calibration track again.

2. The distance measurement method based on the moving coordinate positioning according to claim 1, wherein at least one path parameter model is preset in the detection terminal and is adapted for generating the calibration track with a standard geometry according to the length of the predetermined route that is input.

3. The distance measurement method based on the moving coordinate positioning according to claim 1, further comprising: taking the preset calibration track as the calibration track when the movement track of the detection terminal is within the range of the preset calibration track.

4. The distance measurement method based on the moving coordinate positioning according to claim 3, wherein when the calibration track is annular, a number of movement laps is calculated by the detection terminal according to initial coordinates.

5. The distance measurement method based on the moving coordinate positioning according to claim 3, wherein the preset calibration track includes any one or more of an international standard race track, a rectangular track, a circular track, and an oval track.

6. The distance measurement method based on the moving coordinate positioning according to claim 1, wherein the correction coordinates are located at a vertical connection point between the real-time coordinates and the forward direction of movement.

7. The distance measurement method based on the moving coordinate positioning according to claim 1, wherein the range of the calibration track is to radiate circles with a circle center of any point on the calibration track and a radius of 10-20 meters.

8. The distance measurement method based on the moving coordinate positioning according to claim 1, wherein the detection terminal implements coordinate positioning based on any or more of Global Positioning System (GPS), BeiDou Navigation Satellite System (BDS), GLONASS Navigation Satellite System, and GALILEO Navigation Satellite System.

9. The distance measurement method based on the moving coordinate positioning according to claim 1, wherein the calibration track is generated according to a route file imported to the detection terminal.

10. The distance measurement method based on the moving coordinate positioning according to claim 9, wherein the correction coordinates are located at a vertical connection point between the real-time coordinates and the forward direction of movement.

11. The distance measurement method based on the moving coordinate positioning according to claim 9, wherein the route file is imported from a navigation map application built in the detection terminal or other devices.

12. A portal terminal device, comprising:
one or more processors;
a memory; and
one or more programs, stored in the memory and configured to be executed by the one or more processors, and the one or more programs comprising instructions for executing the distance measurement method based on the moving coordinate positioning according to claim 1.

13. A non-transitory computer-readable storage medium for storing a computer program for testing, when executed by a processor to implement the distance measurement method based on the moving coordinate positioning according to claim 1.

14. The distance measurement method based on the moving coordinate positioning according to claim 1, wherein:
the preset calibration track is presented in a flashing state or a low-light display state when the preset calibration track is generated; and
in response to determining that the movement track is within the range of the preset calibration track, the flashing state of the preset calibration track is stopped or the preset calibration track is presented in a highlight display state.

15. A portal terminal device, comprising:
a portal detection terminal, comprising:
a calibration track generation module, adapted for:
obtaining a movement track of the portal detection terminal according to a moving coordinate positioning; and
generating a calibration track adaptive to a predetermined route in the portal detection terminal, generating the calibration track including:
generating a preset calibration track corresponding to the predetermined route according to a length of the predetermined route; and
in response to determining that the movement track is not within a range of the preset calibration track, reminding a user of the portal detection terminal to change parameters of the predetermined route or change the predetermined route; and
a correction module, adapted for correcting a distance recorded by the portal detection terminal in real time according to a comparison result between the movement track and the calibration track;
wherein the correction module is further adapted for:
when the movement track of the portal detection terminal is within a range of the calibration track, mapping real-time coordinates of the portal detection terminal onto a closest point of the calibration track in a forward direction of movement to form correction coordinates which are located on the calibration track, and calculating a movement distance of the portal detection terminal according to the correction coordinates;
when the real-time coordinates deviate from the range of the calibration track, calculating the movement distance by accumulation according to values of the real-time coordinates until current real-time coordinates are located in the range of the calibration track again.

16. The portal terminal device according to claim 15, wherein the calibration track generation module comprises at least one path parameter model adapted for generating the calibration track with a standard geometry according to data of the predetermined route that is input.

17. The portal terminal device according to claim 16, wherein the portal detection terminal is provided with a lap recorder which is adapted for calculating a number of movement laps according accordingly to initial coordinates of the portal detection terminal when the calibration track output by the at least one is annular.

18. The portal terminal device according to claim 16, wherein the path parameter model includes any one or more of an international standard race track, a rectangular track, a circular track, and an oval track.

19. The portal terminal device according to claim 15, wherein the calibration track generation module is further adapted for taking the preset calibration track as the calibration track when the movement track of the portal detection terminal is within the range of the preset calibration track.

20. The portal terminal device according to claim 15, wherein the calibration track generation module is further adapted for generating the calibration track according to a route file imported to the portal detection terminal.

21. The portal terminal device according to claim 20, wherein the route file is imported from a navigation map application built in the portal detection terminal or other devices.

22. The portal terminal device according to claim 15, wherein the correction coordinates are located at a vertical connection point between the real-time coordinates and the forward direction of movement.

23. The portal terminal device according to claim 15, wherein the range of the calibration track is to radiate circles with a circle center of any point on the calibration track and a radius of 10-20 meters.

* * * * *